US011350330B2

(12) United States Patent
Sathe et al.

(10) Patent No.: US 11,350,330 B2
(45) Date of Patent: *May 31, 2022

(54) SYSTEM INTEGRATION FOR NETWORK SWITCHOVER ACROSS GEOGRAPHIC BOUNDARIES

(71) Applicant: T-Mobile USA, Inc., Bellevue, WA (US)

(72) Inventors: Advait Sathe, Redmond, WA (US); Gregory L. Golden, Seattle, WA (US); Megan Filer, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/671,079

(22) Filed: Oct. 31, 2019

(65) Prior Publication Data

US 2020/0068469 A1    Feb. 27, 2020

Related U.S. Application Data

(62) Division of application No. 14/985,207, filed on Dec. 30, 2015, now Pat. No. 10,470,092.

(51) Int. Cl.
*H04W 36/14*    (2009.01)
*H04W 36/26*    (2009.01)
(Continued)

(52) U.S. Cl.
CPC .......... *H04W 36/14* (2013.01); *H04L 67/306* (2013.01); *H04W 4/024* (2018.02); *H04W 4/029* (2018.02); *H04W 36/26* (2013.01)

(58) Field of Classification Search
CPC ................ H04W 36/14; H04W 36/26; H04W 4/02–029; H04W 4/04–046;
(Continued)

(56) References Cited

U.S. PATENT DOCUMENTS

2013/0308470 A1    11/2013    Bevan et al.
2014/0004832 A1    1/2014    Dabbiere et al.
(Continued)

OTHER PUBLICATIONS

Office Action for U.S. Appl. No. 14/985,207, dated Feb. 21, 2019, Sathe et al., "System Integration for Network Switchover Across Geographic Boundaries", 17 pages.
(Continued)

*Primary Examiner* — Eric Myers
(74) *Attorney, Agent, or Firm* — Lee & Hayes, P.C.

(57) ABSTRACT

Described herein are systems and methods for allowing seamless switchover from one radio access provider to another while traveling. A carrier component, such as a widget, can be embedded in the website operated by a travel agency, and when a traveler makes a travel reservation, the carrier component can send travel information to servers operated by the radio access provider. The radio access provider may retrieve a customer profile associated with the traveler and configure the wireless communication device or the account services associated with the traveler to maintain uninterrupted voice and/or data coverage for the wireless device while traveling.

20 Claims, 6 Drawing Sheets

(51) Int. Cl.
*H04W 4/024* (2018.01)
*H04W 4/029* (2018.01)
*H04L 67/306* (2022.01)

(58) Field of Classification Search
CPC ...... H04W 4/024; H04W 4/029; H04L 67/02; H04L 67/306; G06F 17/30241
See application file for complete search history.

(56) References Cited

U.S. PATENT DOCUMENTS

2014/0337130 A1* 11/2014 Lawson ............. G06Q 30/0255
705/14.53
2017/0195928 A1 7/2017 Sathe et al.

OTHER PUBLICATIONS

Office Action for U.S. Appl. No. 14/985,207, dated Mar. 22, 2018, Sathe et al., "System Integration for Network Switchover Across Geographic Boundaries", 11 pages.
Office Action for U.S. Appl. No. 14/985,207, dated Sep. 20, 2018, Sathe et al, "System Integration for Network Switchover Across Geographic Boundaries", 16 pages.

* cited by examiner

402a

FLYING FROM — 404
SEA (SEATTLE-TACOMA INT'L)

FLYING TO — 406
MEX (MEXICO CITY INT'L)

DEPARTING — 408
DECEMBER 15, 2015

RETURNING — 410
JANUARY 18, 2015

ADULTS — 412
2

CHILDREN
0 — 414

☐ ADD HOTEL — 416
☐ ADD A CAR — 418
☐ ADD A TRAVEL DATA PASS — 420

[NEXT]

YOUR TRIP TO MEXICO CITY

WHO'S TRAVELING

FIRST NAME — 422

LAST NAME — 424

PHONE NUMBER — 426

[NEXT]

FIG. 4b

SYSTEM INTEGRATION FOR NETWORK SWITCHOVER ACROSS GEOGRAPHIC BOUNDARIES

PRIORITY

This Application is a divisional of, and claims priority to U.S. patent application Ser. No. 14/985,207, filed on Dec. 30, 2015, which is incorporated herein by reference.

This application is a divisional of, and claims priority to, U.S. patent application Ser. No. 14/985,207, filed on Dec. 20, 2015, entitled "SYSTEM INTEGRATION FOR NETWORK SWITCHOVER ACROSS GEOGRAPHIC BOUNDARIES", and is fully incorporated by reference herein.

BACKGROUND

The increasing use of wireless communication devices has led to a corresponding increase in the variety of networks that such devices can connect to. For example, peripatetic users of wireless communication devices may come within range of a variety of radio communication towers operating on licensed bands, such as cellular telephony bands or Personal Communication Service (PCS) bands, Advanced Wireless Services (AWS) bands, and Global System for Mobile Communications (GSM) bands. Additionally, wireless communication devices may also come within range of various Wi-Fi networks as their users move the wireless communication devices within range of various public and private Wi-Fi networks, such as when the users travel from home to work, visit a coffee shop, enter an airport, or enter a school.

Many of the frequency bands available for radio communication are exclusively licensed to a carrier who provides communication access to wireless communication devices that are subscribed to the carrier's services. As long as the wireless communication device is within the carrier's geographic service area, the wireless communication device can send and receive voice and/or data communications on the home network that is provided by the carrier (often referred to as the "home network"). However, as a wireless communication device travels outside the geographic service area, the wireless communication device may attempt to connect to another available network (often referred to as a visited network) that is not provided by the carrier to which the wireless communication device is subscribed. Similarly, as a wireless communication device travels internationally, a connection from a cell phone tower provided by the subscribed wireless carrier may not be available. Oftentimes, this results in a wireless communication device entering a roaming mode, in which the wireless communication device connects to a visited network after traveling beyond the geographic coverage area of the home network. While the wireless communication device may be able to send and receive voice and/or data communications while roaming on a visited network, roaming usage typically results in significantly higher fees for the user as they connect to a visited network.

Moreover, the process to connect to a visited network may require reconfiguration of the wireless communication device or input from the user in order to maintain voice and data service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4a illustrates a sample website user interface configured to provide a peripatetic user the ability to preconfigure their wireless communication device for operating on a visited network.

FIG. 4b illustrates another sample website user interface configured to gather information about a peripatetic user in order to link their wireless communication device with a future planned travel itinerary.

DETAILED DESCRIPTION

Figure 1:
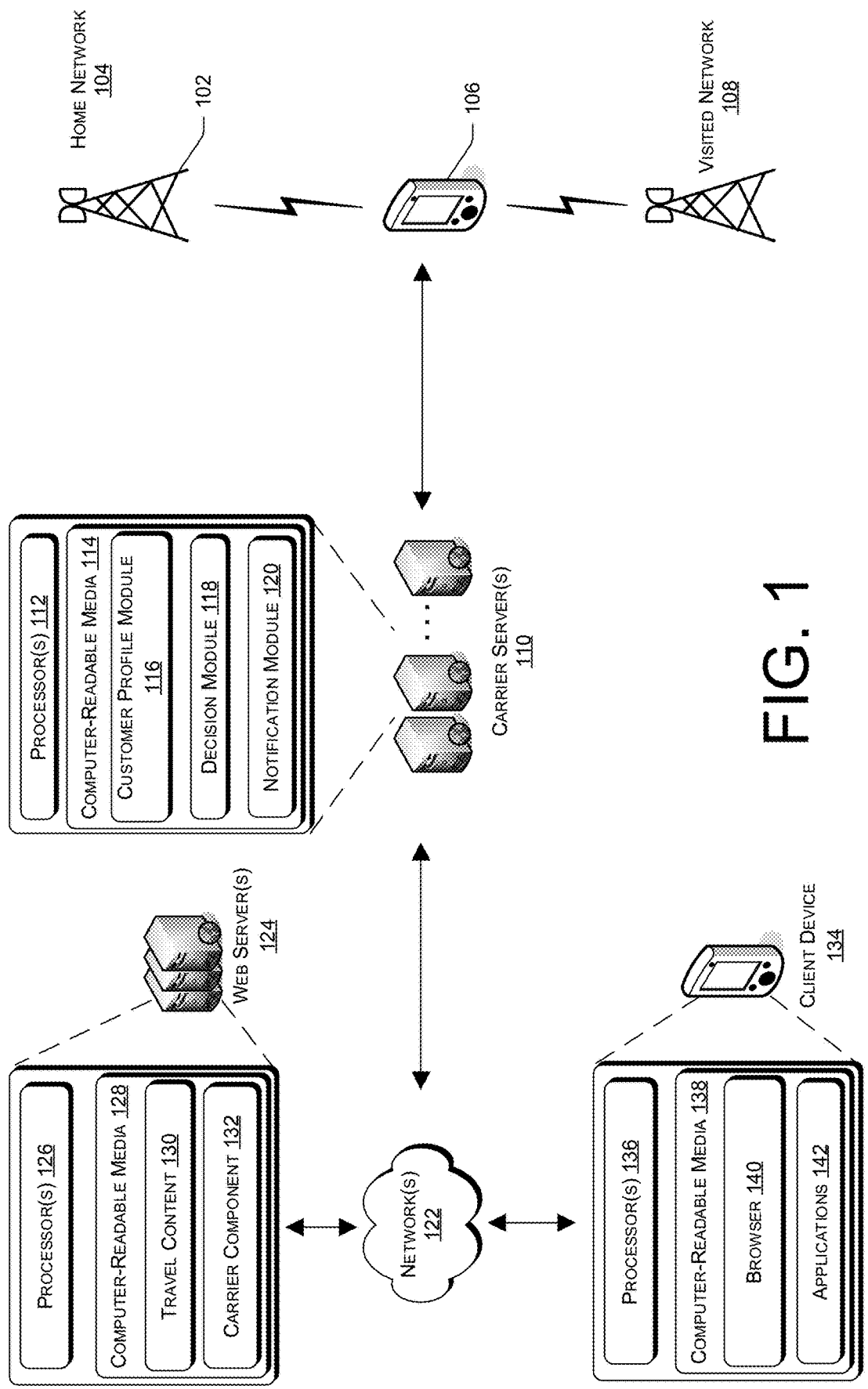
FIG. 1 illustrates an overview of a radio access provider that provides a home network for a wireless communication device and also facilitates a visited network switchover when the wireless communication device travels outside the coverage area.

This disclosure describes, in part, a system and method for identifying wireless communication devices that will be traveling beyond the geographic boundary of a home network to which the wireless communication device is subscribed, and configuring the wireless communication device for a seamless switchover to a visited network.

In some instances, providing service to a wireless communication device while traveling includes receiving travel itinerary information for a user associated with the wireless communication device. The travel itinerary may include the destination location and a date of travel for the user. Information regarding the user and a user account may be retrieved, which may contain an identification of services for which the user has paid for. In reviewing the user account and the subscribed services, it may be determined that the user's wireless communication device will not have voice and/or data service at the destination location, primarily because the carrier may not operate cellular telephony towers in the destination location. In some embodiments, the wireless communication device is configured to connect to a partner wireless communication network while traveling.

During travel, the wireless communication device may connect to one or more cellular network services, such as those provided by a partner carrier that operates within the destination location. Additionally, the wireless communication device may connect to one or more Wi-Fi networks, such as Wi-Fi networks that are available at an airport, on an airplane, on a bus, train, or ship, or in another location that the wireless communication device will be in range of while traveling.

In some instances, a widget is embedded in a website operated by a travel agency. Suitable travel agencies include airlines that book travel directly, third part agent services that book travel across a variety of airlines, hotels, ships, trains, buses, and other modes of travel. Any of the websites operated by a travel booking company may incorporate a widget from the carrier. In some embodiments, the widget will collect information about the traveler, such as the traveler's name, cell phone number, and future travel itinerary. This information may be sent to the carrier, such as by sending electronic information to one or more serves operated by the carrier.

The carrier may determine that the traveler will not have cellular service at the destination location, and may send a communication to the wireless communication device with an offer to purchase a voice and/or data plan that will allow uninterrupted service while traveling.

In some instances, the wireless communication device is a global positioning enabled device. In these cases, the carrier may be able to detect the location of the wireless communication device and the carrier may be able to configure the wireless communication device for connection to a partner wireless communication network based upon the detected location of the wireless communication device.

Along with methods disclosed herein, there is also disclosed a non-transitory computer-readable medium that has executable instructions that, when executed by a computing device, cause the computing device to perform one or more operations. For example, the instructions may cause the computing device to receive travel itinerary information for a user associated with a wireless communication device. The itinerary information may include a wireless communication device identifier, such as the cell phone number, and IMEI number, a serial number, or other identification of the wireless communication device. In some embodiments, the wireless communication device identifier allows the carrier to identify a user associated with the wireless communication device. The itinerary may also include a travel destination and a travel date, among other items of information.

Based upon the itinerary information, the instructions may cause the computing device to look up account information associated with the wireless communication device and determine which services the user has paid for (subscribed to), that may benefit the user while traveling. In some instances, the subscribed services will not provide the traveler with voice and/or data communication while traveling. In these cases, the wireless communication device may be authorized to have voice and/or data service while traveling. This may be done by configuring the wireless communication device, or by adjusting the permissions of the user account by the carrier to allow the wireless communication device to connect to a partner network while traveling.

The itinerary information may be provided by a widget programmed into a website operated by a travel reservation company. Alternatively, the itinerary information may be provided to the carrier by the traveler.

In those instances where it is determined that the wireless communication device will not have voice and/or data coverage while traveling, the instructions may cause the computing device to send a notification to the wireless communication device offering the user associated with the wireless communication device voice and/or data services at the destination. The user may complete a purchase transaction to pay for uninterrupted voice and/or data service while traveling at one or more destinations.

The instructions may also cause the computing device to send a notification to the wireless communication device to remind the user to activate voice over IP (VoIP) service or Wi-Fi enabled calling, or may provide a reminder about the services that the user has already paid for that will be beneficial while traveling.

According to some embodiments, a method is provided for a radio access provider to allow its customers to maintain voice and/or data coverage while traveling. The method may include receiving travel itinerary information for a user. The information may be sent, for example, by a widget located within a travel reservation website. The information may include at least a travel destination for the user. In some instances, the wireless communication device is configured to connect to a partner network at the travel destination. The partner network may include a cellular telephony network, a Wi-Fi network, or other suitable communications network.

The configuring of the wireless communication device for a partner network may be performed automatically, such as by sending instructions to the wireless communication device. It may also be performed by the user based upon a reminder sent by the carrier, which may also include instructions on how to configure the wireless communication device. Additionally, the wireless communication device may be configured to connect to a partner network by adjusting permissions associated with the user account maintained by the carrier.

The wireless communication device may be configured to connect to a partner network based upon the travel date associated with the itinerary, based upon a request by the user, by location information sent from the wireless communication device, or based upon some other trigger.

The carrier may send the user a communication that offers the user the opportunity to purchase additional products or services that will allow the user to maintain voice and/or data communication while traveling. In this way, the user will be notified that the wireless communication device may not be able to connect to a wireless communication network while traveling, and may opt to purchase additional services prior to travel to maintain uninterrupted voice and/or data service.

Overview

FIG. 1 illustrates an overview of a radio access provider 102 that provides a home network 104 for a wireless communication device 106 and also provides a visited network 108 switchover when the wireless communication device 106 travels outside the coverage area. Many of the frequency bands available for radio communication are exclusively licensed to a radio access provider, or carrier, that provides communication access to wireless communication devices that are subscribed to the carrier's services. As used herein, a home network is the telecommunications network that is provided by the radio access provider 102 to which the wireless communication device 106 is subscribed. As long as the wireless communication device 106 is within the radio access provider's geographic service area, the wireless communication device 106 can send and receive voice and/or data communications on the home network 104 that is provided by the radio access provider 102.

However, as a wireless communication device 106 is repositioned beyond the boundary of the home network 104, in order to maintain coverage, it must connect to another network (a "visited network") 106 that is not maintained by the radio access provider 102. In some instances, a wireless communication device 106 does this by roaming. In other words, it may connect to a visited network 108 for a fee.

In various implementations, the radio access provider 102 may comprise any one or more base stations, node Bs, eNode Bs, or wireless access points (e.g., Wi-Fi access points, WiMax access points, etc.). The radio access provider 102 may include components fixing the radio access provider 102 to a location and positioning the radio access provider 102 at that location, such as components of a cell tower. The radio access provider 102 may also support one or more cells of varying sizes, such as macrocells, microcells, picocells, femtocells, or other small cells, of one or more access networks of a telecommunication network. To provide wireless connectivity to the telecommunication network, the radio access provider 102 may be equipped with any number of components, such as radio antennas, transmitter components, receiver components, power amplifiers, combiners, duplexers, encoder components, decoder components, band pass filters, power sources, or control components. The radio access provider 102 may also include one or more carrier servers 110, such as a server or server farm, multiple, distributed server farms, a mainframe, a work station, a personal computer (PC), a laptop computer, a tablet computer, an embedded system, or any other sort of device or devices.

In further implementations, the radio access provider 102 may transmit and receive over multiple frequency bands. Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WiMax frequency band In some implementations, the telecommunication network which includes the radio access provider 102 may include multiple other radio access providers associated with multiple other access networks (visited networks 108), ensuring continued coverage as the wireless communication device 106 moves from location to location. The telecommunication network may implement the home network 104 as, for example, a System Architecture Evolution (SAE) home network, a General Packet Radio Service (GPRS) home network, or any other sort of home network. The home network 104 may include a gateway GPRS support node (GGSN), a serving GPRS support node (SGSN), a mobile switching center (MSC), a home location register (HLR), a visitor location register (VLR), a mobility management entity (MME), a serving gateway (SGW), a packet data network gateway—also referred to as a packet gateway (PGW), a home subscriber server (HSS), or an evolved packet data gateway (ePDG). The access network(s) and home network 104 of the telecommunication network may associated with any one or more access technologies, such as 2G, 3G, 4G, 5G, GSM, CDMA, UMTS, HSPA, HSPA+, LTE, LTE-Advanced, Wi-Fi, or WiMax.

In various implementations, the wireless communication device 106 may be any sort of computing device known in the art that is capable of communicating over one or more frequency bands. Examples of wireless communication devices 106 include a PC, a laptop computer, a server, a server farm(s), a mainframe, a tablet computer, a work station, a telecommunication device, a smartphone, a cell phone, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

In further embodiments, the frequency bands available to a wireless communication device 106 may change based on a location of that wireless communication device 106. As the wireless communication device 106 moves beyond the service area of the home network 104, a visited network 108 may become available to which the wireless communication device 106 is able to connect with.

The radio access provider 102 may maintain one or more carrier servers 110. In some implementations, the carrier servers 110 have one or more processors 112 and computer-readable storage media 114. The computer-readable storage media 114 is non-transitory and may store various instructions, routines, operations, and modules that, when executed, cause the processors to perform various activities. In some implementations, the one or more processors 112 are central processor units (CPU), graphics processing units (GPU) or both CPU and GPU, or any other sort of processing unit. The non-transitory computer-readable storage media may include volatile and nonvolatile, removable and non-removable tangible, physical media implemented in technology for storage of information, such as computer readable instructions, data structures, program modules, or other data. System memory 202, removable storage 214 and non-removable storage 216 are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the carrier servers 110.

As illustrated in FIG. 1, the computer-readable storage medium of the carrier servers 110 maintains various modules, such as a customer profile module 116, a decision module 118, and a notification module 120. Of course, other modules may be included and may be configured with instructions to carry out various other tasks not further described herein.

The carrier servers 110 may be configured to communicate with a network 122, such as the internet, to send and receive data communications. Additional servers and devices may be configured to likewise communicate with the network 122.

In some instances, one or more web servers 124 are configured to communicate with the network and with the carrier servers 110. The web servers 124 may be operated by the carrier or by another party or entity. In some embodiments, the web servers 124 are operated by a travel partner, or some other third party that has partnered with the carrier.

The web servers 124 may have one or more processors 126 and computer-readable storage media 128. The computer-readable storage media 128 may store information, such as travel content 130 and a carrier component 132. The travel content 130 may be travel information, such as airline flight schedules, hotel booking information, car rental information, and the like, along with the functionality to allow a user to purchase services from various travel providers. In some cases, the travel content 130 allows a user to purchase airline flights, hotel accommodations, car rentals, and other such goods and services in order to facilitate travel.

The carrier component 132 may be integrated with the travel content 130 and may provide travel data to the carrier servers 110 through the network 122. For example, when a user visits a website hosted on the web servers 124 and purchases a reservation for air travel, the carrier component 132 may send information relating to the reservation for air travel to the carrier servers 110 through the network 122. The information may include, for example, the identity of the traveler, a cellular phone number associated with the traveler, the dates of travel, and the destination(s), among other information.

A client device 134 may include one or more processors 136 and computer-readable storage media 138 that stores instructions that allow the client device 134 to communicate with the web servers 124 over the network 122. The instructions may include a browser 140, such as an internet browser, that allows a user of the client device 134 to view information available through the internet. Specifically, a browser 140 may be used to display travel content 130 made available by the web servers 124, and further allows a user to purchase travel reservations. In addition, or alternatively, the client device 134 may include one or more applications 142, one or more of which may allow a user to view and purchase travel. For example, an application 142 may be specific to an airline, or a hotel, or a rental car agency, or may be specific to a broker of such services. In this way, an application 142 may allow a user to view multiple travel itineraries, and select the itinerary and additional services that meet the user's needs, and further provide a way to book the travel itinerary.

Through the use of the browser 140, or the application 142, a user may purchase a reservation for an airline ticket, a hotel, a rental car, a train ticket, a bus ticket, passage on a ship, or a combination of travel related services. The reservations that detail the specific services and itineraries are stored as travel information. The web servers 124 receive the travel information and the carrier component 132 may send the travel information to the carrier servers 110.

The client device 134 may be the same as the wireless communication device 106. For example, the user may view and purchase travel reservations on a smart phone, which may be the same smart phone that the user will ultimately take with them while traveling. In some instances, the client device 134 may be different than the wireless communication device 106. Examples of client devices 134 include a PC, a laptop computer, a server, a server farm(s), a mainframe, a tablet computer, a work station, a telecommunication device, a cellular telephone, a smartphone, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

As the travel information is received by the carrier servers 110, the carrier servers may take any of a number of actions based upon the travel information. For example, the customer profile module 116 may retrieve information specific to the user that booked the travel itinerary. The carrier servers 110 may determine that the user is a current customer of the carrier and, through the notification module 120, provide notifications, reminders, offers, or other information to the user through any available communication format. For example, through the notification module 120, the carrier may contact the user through email, telephone, SMS text messaging, through a website, or through some other communication format.

The notification module 120 may send a reminder of upcoming travel to the client device 134, the wireless communication device 106, or both. The decision module 118 may be able to analyze the services to which the user has subscribed. In other words, the decision module 118 may be able to see what services the user has already paid for and may be able to take advantage of while traveling, such as in-flight internet access, international calling, voice over IP capabilities, and the like. The decision module 118, in cooperation with the notification module, may determine available services while the user is traveling, and the notification module 120 may send information to the wireless communication device 106, or the client device 134, such as a notification about available services, such as Wi-Fi connectivity while in an airport, on an airplane, in a hotel, or otherwise. In some instances, the notification module 210 may inform the user that the wireless communication device 106 is able to connect to Wi-Fi while on the airplane and send a reminder to configure their wireless computing device for Wi-Fi access while on the airplane. Of course, the carrier communication may comprise an authorization from the user to allow the carrier to automatically configure the wireless communication device for Wi-Fi access while on the airplane.

In addition, based upon the analysis by the decision module 118, the carrier communication may include information relating to voice and/or data access once the user reaches the destination. The carrier communication to the user may indicate that the home network 102 may be unavailable once the user reaches the destination, but that a visited network 108 will be available. Additionally, the carrier communication may include information regarding connecting to the visited network 108, such as the identity of the visited network 108, relevant pricing information, or required modifications to the wireless communication device 106 in order to connect to the visited network 108. Moreover, the carrier may provide the user with the opportunity to purchase a travel data plan that will allow the wireless communication device 106 to connect with the visited network 108 with little or no further input or configuration from the user.

Figure 2:
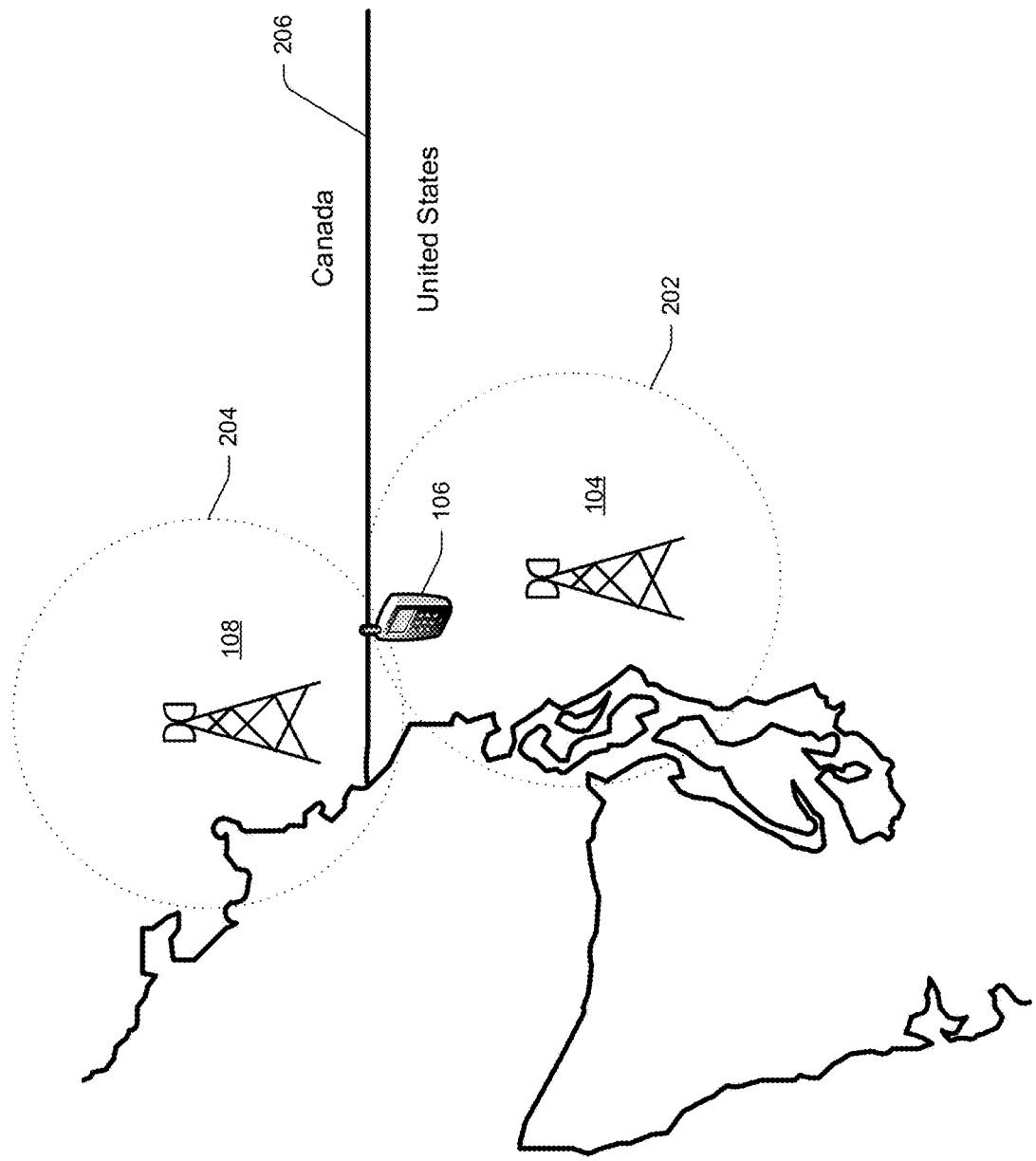
FIG. 2 illustrates coverage areas of a home network and a visited network that are geographically separated.

FIG. 2 illustrates an example environment in which a wireless communication device 106 may switch from a home network 104 to a visited network 108. The home network 104 has a home network boundary 202 within which the broadcast radio signal maintains a preferred quality of service. As a wireless communication device 106 approaches or moves beyond the home network boundary 202, the signal strength begins to degrade and, while the wireless communication device 106 may still be able to connect to the home network 104, the quality of service may begin to degrade. In some instances, the wireless communication device 106 includes location capabilities, such as by implementing a global positioning system (GPS) so that its location may be determined. The carrier servers 110 may receive location data from the wireless communication device 106 and, based upon the location data, may handoff the connection with the wireless communication device 106 to a partner network, such as visited network 108.

This scenario may occur when a wireless communication device 106 travels beyond the home network boundary 202, such as when the wireless communication device 106 approaches, or crosses, an international boundary 206. With additional reference back to FIG. 1, where the carrier servers 110 receive information indicating that a wireless communication device 106 will be crossing an international boundary 206 in the future, the carrier servers 110, relying on the decision module 118 and the notification module 120, may provide the user with the opportunity to configure the wireless communication device 106 to seamlessly connect with the visited network 108. The carrier servers 110 may receive travel data from the web servers 124, such as data indicating a future hotel reservation across the international boundary 206, or a reservation for a future international flight. Based on the travel data, the decision module 120 may determine the services that the wireless communication device 106 associated with the traveler currently has, and may offer, through the notification module 120, additional services that may be beneficial to the traveler. For example, the traveler may be offered a travel data pass that will allow the wireless communication device 106 to automatically connect to a visited network 108.

For instance, the decision module 118 may determine that the wireless communication device 106 does not have a subscription plan that allows voice and/or data services once the wireless communication device 106 crosses the international boundary 206 from the United States into Canada. The decision module 118 may then determine that the traveler could benefit from purchasing additional services, such as a subscription plan that allows the wireless communication device 106 to communicate via voice and/or data by connecting to the visited network 108. The notification module 120 can then inform the traveler, such as through email, SMS text messaging, web notifications, a telephone call, or any other suitable form of communication, that the traveler would likely benefit by purchasing additional services prior to traveling.

The decision module 118 may determine that the traveler has a subscription to services that allow for international voice and data, and may further determine that the wireless communication device 106 needs to be configured to take advantage of these services. The notification module 120 may inform the traveler, such as via an SMS text message, that the wireless communication device 106 needs to be configured to take advantage of the additional services that may be beneficial while traveling. Alternatively, the carrier may automatically configure the wireless communication device 106 to take advantage of additional services.

Figure 3:
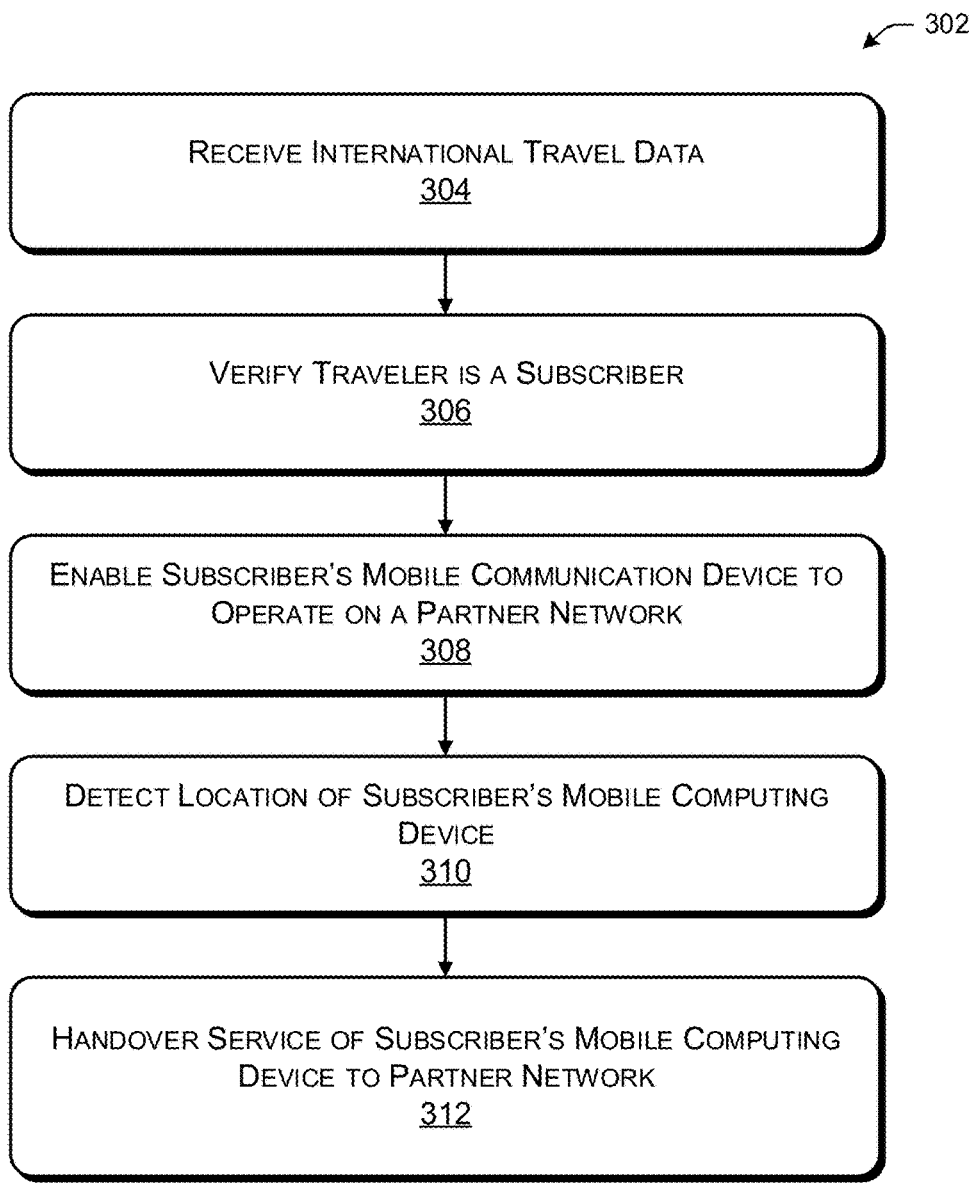
FIG. 3 illustrates an example process for preparing a wireless communication device for switchover from a home network to a visited network.

FIG. 3 illustrates an example process 302 for preparing a wireless communication device for switchover from a home network 104 to a visited network 108. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The processes may be performed by hardware, such as the hardware illustrated in the figures and described herein.

In one embodiment, international travel data is received at block 304. The international travel data may include, for example, the name of the traveler, the starting and destination points, including any waypoints for upcoming travel, the dates of travel, hotel reservation information, a mobile telephone number associated with the traveler, car rental information, and other such information that may pertain to the traveler or an upcoming trip.

The international travel data may be sent from a web server 124 associated with a travel partner. For instance, a travel partner may operate a website that allows potential travelers to view flight schedules, hotel booking information, car rental rates, and other desirable services offered to a traveler. The travel partner website may additionally allow the traveler to purchase the aforementioned services and in the process, collect identifying information about the traveler. In some embodiments, the travel partner website includes a carrier component 132, which may be computer code that collects some, or all, of the traveler identifying information along with the travel itinerary information, and sends the information to the carrier servers 110. In some implementations, the carrier component 132 is a widget incorporated into a website operated by one or more travel partners.

At block 306, it is verified whether the traveler is a subscriber to services of the carrier. This may be done, for example, by comparing a mobile telephone number associated with the traveler against a database of current subscribers of the carrier's services. If the traveler is a subscriber to the services of the carrier, the subscribed services and benefits of the traveler are determined to ensure that the traveler may have uninterrupted service while traveling. In some cases, this may require settings on the wireless communication device 106 associated with the traveler to be configured. In other instances, uninterrupted service while traveling may require additional purchases by the traveler. The traveler may be prompted to purchase additional services, such as a travel data plan, to ensure that the traveler has uninterrupted voice and/or data service while traveling outside the home network 104 coverage area.

At block 308, the wireless communication device 106 is configured to provide uninterrupted service while traveling. In some instances, the wireless communication device 106 is configured for voice over internet protocol (VoIP) communication. In other instances, the wireless communication device is configured to prevent radio broadcast on cellular frequencies, but configured to operate in Wi-Fi-only mode. This may be useful, for example, on some airline flights that disallow wireless communication devices 106 from operating in cellular telephone mode, but allow connection to an on-board Wi-Fi network. Other configuration settings may need to be adjusted to connect to a visited network 108. Of course, the configuration settings may be performed by the traveler, by the carrier through instructions sent to the wireless communication device 106, or by a combination.

At block 310, the location of the wireless communication device 106 may be determined. This may be performed, for example, by utilizing location information sent from the wireless communication device 106 such as by accessing GPS service hardware and software implemented within the wireless communication device 106 and sending the location data to the carrier servers 110. The location data may be useful in determining when to effect a handover from the home network 104 to the visited network 108, or vice versa. The determination may be made by the carrier servers 110, or may be made by the wireless communication device 106. In either event, the determination to effect the handover may be performed by analyzing the location data sent from the wireless communication device 106, or by comparing signal strength between the home network 104 and the visited network 108 and changing networks when the difference in signal strength exceeds a predetermined threshold, or through a combination of suitable techniques.

At block 312, the radio frequency communication with the wireless communication device 106 is handed over from the home network 104 to the visited network 108. In some instances, the handover is seamless to the traveler and any necessary configuration settings are performed automatically. In other instances, the wireless communication device 106 displays a message indicating whether the traveler wants to connect to the visited network and awaits for confirmation from the traveler.

FIG. 4*a*. illustrates one example embodiment of a travel website graphical user interface (GUI) 402*a*. The illustrated example shows flight information; however, the following description may apply equally to hotel accommodations, car rental services, train travel, boat travel, bus services, or any other travel related services.

The travel website GUI 402*a* may include flight information such as an indication of a departure airport 404 and a destination airport 406. Travel dates may be displayed as a departing date 408 and a returning date 410. Additionally, the number of passengers may be selected, and may further be categorized to indicate the number of adult passengers 412 and child passengers 414. Additional options may be selected, such as indicia to indicate a desire to add a hotel 416, a rental car 418, a travel data pass 420, or other additional services. In some embodiments, additional information may be provided, such as a more thorough description of the travel data pass and how to obtain one to ensure that the traveler has communication coverage for the wireless communication device 106 while traveling.

In one instance, when a user of the travel website GUI indicates a desire to acquire a travel data pass, selecting the "NEXT" button, or something similar, may bring up additional details regarding the travel data pass. For example, the available pricing plans, coverage maps, data transfer limits, and other such useful information may be provided to facilitate a transaction with the traveler. Additionally, the travel data pass details can be customized because the traveler has already indicated a travel date and destination, which may be used to customize the travel data plan. As the traveler enters the desired itinerary information, the widget may send the travel related information to the carrier servers 110, which may update the widget to display personalized information to the traveler.

For example, the widget may include a personalized message to the traveler informing them of current carrier services they may already be subscribed to. It may additionally provide offers for additional servers that the traveler could benefit from. In some embodiments, the widget may inform the traveler of services offered by the carrier and provide an opportunity to purchase services from the carrier. As an additional example, information passed to the carrier servers 110 by the widget will allow the carrier servers 110 to determine that the traveler is not a current subscriber to the carrier services. The carrier servers 110 may then pass information to the widget fir display to the user, such as information personalized to the traveler including carrier service rates, and may include plans and rates for providing voice and/or data communication while traveling to the destination.

In addition, the details regarding the travel data pass may be provided on the travel website user interface, on a pop out window, in a new browser tab, or the traveler may be directed or redirected to the website of the carrier in order to review information and complete the acquisition of the travel data pass.

FIG. 4*b* illustrates another embodiment of a travel website GUI 402*b*. In this embodiment, the travel itinerary is already known. In the illustrated example, the GUI 402*b* is displaying information relating to an upcoming trip to Mexico. The GUI 402*b* may prompt the traveler to enter identifying information, such as a first name 422, a last name 424, and a mobile phone number 426. Of course, there may be additional information requested, such as a home address, a passport number, a driver's license number, or such other identifying information.

In some embodiments, all or part of the identifying information, such as the traveler's name and cellular phone number, are sent to the carrier servers 110 which, utilizing the customer profile module 116, compare the identifying information to a customer database to determine whether the traveler is a subscriber to the carrier's services and if so, to determine the services and benefits that the traveler has already subscribed to. The decision module 118 may determine if there are services that the traveler would benefit from during the trip and the notification module 120 may inform the traveler of existing benefits and services that the traveler has access to, or inform the traveler of services that may be useful and provide an opportunity for the traveler to acquire additional services.

In some embodiments, only the entered cellular phone number 426 is sent to the carrier servers 110. In fact, the carrier component 132, such as a widget, embedded within the travel partner webpage, may be responsible for collecting and transmitting the cellular phone number 426 of the traveler. This information may be enough for the carrier servers 110 to provide notifications, advertisements, or offers to purchase to the traveler to aid the traveler in maintaining continuous voice and/or data coverage while traveling.

If the traveler is not a current subscriber of the carrier, the decision module 118 may determine which services of the carrier would be most beneficial to the traveler and the notification module 120 may then send information to the traveler with an offer to acquire services from the carrier.

Figure 5:
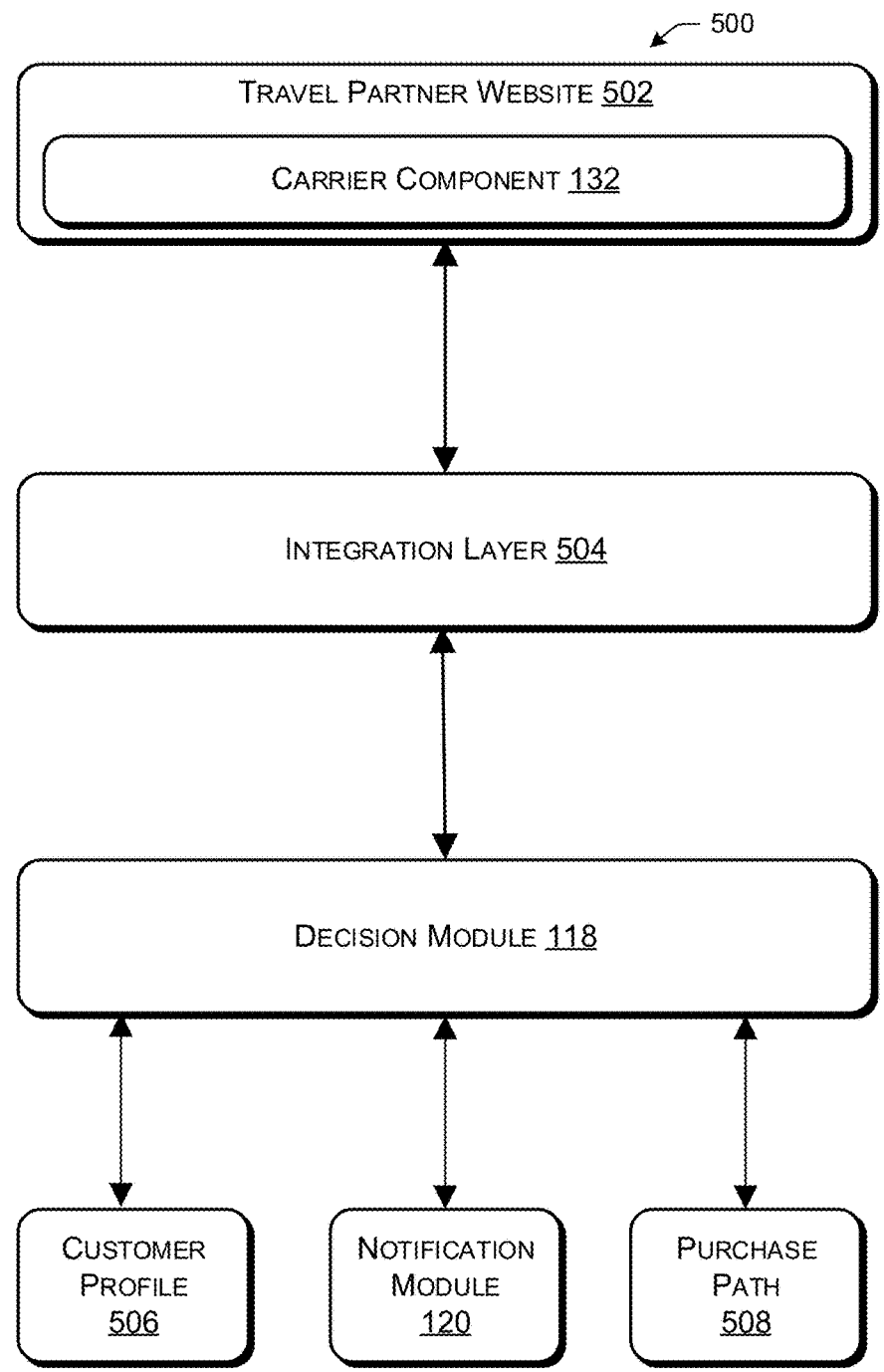
FIG. 5 illustrates an example system architecture for configuring a wireless communication device for travel outside the geographic boundaries of a home network.

FIG. 5 illustrates a sample architecture 500 of the system described herein. A travel partner website 502 provides travel information to a traveler, such as airline schedules, bus schedules, train schedules, hotel accommodation information, car rental information, and the like. Additionally, the travel partner website 504 may include a carrier component 132, which in some embodiments, is a widget, configured to collect and/or display some information in conjunction with the travel partner website 502.

In some embodiments, carrier component 132 requests a cellular phone number associated with a traveler and sends the cellular phone number to an integration layer 504. The integration layer 504 may include one or more carrier servers 110, and may also include necessary hardware, software, and modules to receive, process, and send information to and from the travel partner website and other modules and data stores associated with the carrier servers 110.

The integration layer 504 communicates with the decision module 506 to send the traveler information received from the carrier component 132 embedded within the travel partner website 502. The decision module 118 may access one or more modules, routines, databases, or programs to determine the current level and quality of services that the traveler currently subscribes to. The decision module 118 may access a customer profile 506, such as by accessing a customer database, to determine the services that the traveler has subscribed to. The customer profile 506 may include other useful information, such as the traveler's address, the make and model of the wireless communication device associated with the traveler, the length of time that the traveler has been a subscriber of services offered by the carrier, and other such information that the decision module 118 may utilize.

The decision module 118 may also communicate with the notification module 120 to provide recommended services to the traveler. The notification module 120 may send information directly to the wireless communication device 106 associated with the traveler, such as through SMS text messaging or a voice call, or may send information and notifications through other communication channels, such as email or web notifications. The notification module 120 may send recommendations to the traveler for additional services that would be beneficial to the traveler.

For example, the carrier component 132 may send information that allows the decision module to determine the identity of the traveler and details about the traveler's upcoming travel itinerary. The decision module 118 may further determine the carrier services that the traveler subscribes to, and determine that additional services would be beneficial to the traveler. For instance, where the decision module 118 receives information indicating that the traveler will be traveling internationally, the decision module 118 may determine that the traveler will not have voice and/or data services based upon the currently subscribed services. The decision module 118 may then determine that the traveler would benefit from purchasing a travel data pass, which will allow the wireless communication device 106 associated with the traveler to maintain voice and/or data services through a partner carrier by connecting to a visited network 108. The notification module 120 may then notify the traveler of the opportunity to purchase a travel data pass prior to the planned travel date. The purchase path module 508 may provide a way for the traveler to purchase the travel data pass, such as through completing a transaction on the wireless communication device 106, on the client device 134, or through some other transaction method.

Purchasing a travel data pass prior to travel may provide several benefits to the traveler. For instance, in many cases, the cost of a travel data pass is significantly less expensive than using roaming services. Additionally, the prior purchase of the travel data pass may allow the wireless communication device to automatically connect to the visited network with no loss of service. In this way, the traveler does not need to try and configure the wireless communication device 106 after arriving at the destination that is outside the home network boundary 202. In this way, the wireless communication device is improved because, based upon the travel itinerary information sent by the carrier component 132, the wireless communication device 106 can be pre-configured, or automatically configured, to connect to visited networks with no interruption in service, and can be done prior to travel, or during travel.

Example Processes

Figure 6:
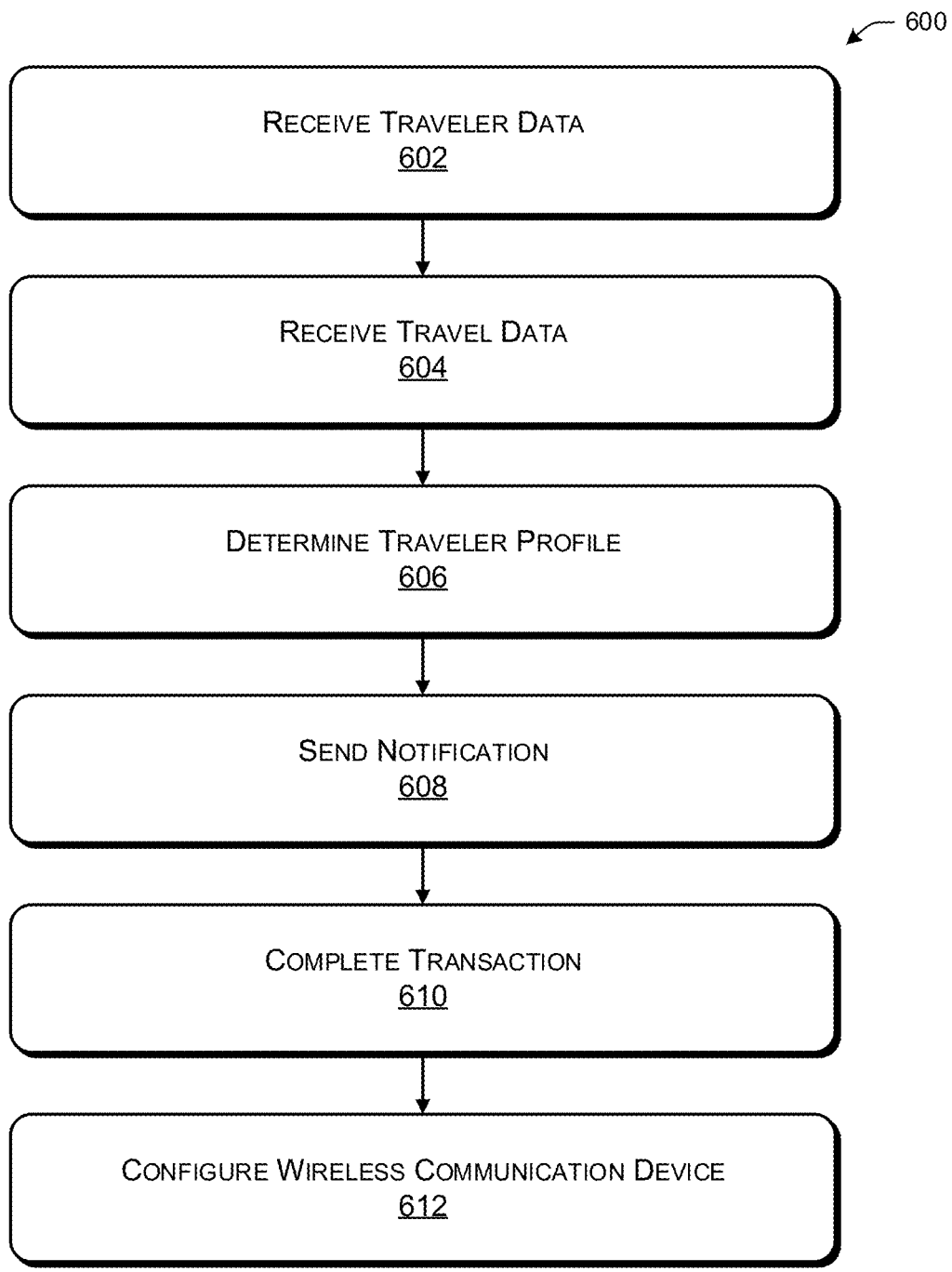
FIG. 6 illustrates an example process of a decision module within the carrier architecture.

FIG. 6 illustrates an example processes of the decision module 118. The process is illustrated as a logical flow graph, each operation of which represents a sequence of operations that can be implemented in hardware, software, or a combination thereof. For example, the operations may be performed by the hardware shown and described in relation to the figures described herein. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 illustrates an example decision process 600 by the decision module 118 for configuring a wireless communication device for continued voice and/or data service while traveling beyond the coverage area of the home network 102.

At block 602, the decision module 118 receives traveler data. In some instances, the traveler data is sent from the carrier component 132 that may be embedded in a travel partner website 502. In other instances, the traveler data may be provided by the traveler, such as through the wireless communication device 106 associated with the traveler, or through a website operated by the carrier.

At block 604, the decision module 118 receives travel data. The travel data may similarly be provided by the carrier component 132 that may be embedded in a travel partner website 502, or may be provided directly by the traveler. In some preferred embodiments, as a traveler makes travel reservations, the itinerary is captured and sent to the decision module 118. The travel data may include one or more of a departure date, a return date, a destination, an airline, a bus service, a ship, a train service, or some other mode of travel that may allow the decision module 118 to determine which, if any, wireless communication services are allowed, prohibited, or made available during travel. For example, where the travel data indicates a particular airline and a flight number, the decision module 118 may be able to determine the time the flight is scheduled to take off, and in fact, can track the scheduled flight to determine whether it is on-time or delayed. In some instances, the decision module 118 may send instructions to the wireless communication device to disable all radio broadcasts from the wireless communication device on specified frequencies for the duration of the flight. In other instances, the decision module 118 may be able to determine that the airline provides Wi-Fi access during the flight, and the wireless communication device may be configured to connect to the Wi-Fi network made available by the airline during the flight.

At block 606, the decision module 118 determines a profile associated with the traveler. This may be accomplished, for example, by retrieving information from a customer database that may include details about the traveler, including the services to which the traveler has subscribed from the carrier, among other things.

The decision module 118, based upon the profile associated with the traveler, may then determine whether the traveler will have voice and/or data service while traveling. The decision module 118, if necessary, will determine which additional services may be necessary for the wireless device so that the traveler will maintain uninterrupted communication while traveling. This may be in the form of a travel data pass that allows the wireless communication device 106 to connect to a visited network 108 with no interruption. It may also require configuring the wireless communication device 106 for VoIP service.

At block 608, the decision module 118 may instruct the notification module 120 to send a notification to the wireless communication device 106, or the traveler, or both. The notification may include information such as, for example, indicating to the traveler that the wireless communication device 106 will be able to maintain uninterrupted radio frequency communication with one or more visited networks, a reminder to enable VoIP service on the wireless communication device 106, or a reminder of included services, such as Wi-Fi access while traveling on an airplane, train, or bus. In some instances, the notification may include an opportunity to purchase additional services, such as a travel data pass, that will allow the wireless communication device 106 to seamlessly connect to a visited network 108 at the destination location. In other instances, the offered additional services may include a purchase to access a Wi-Fi network offered by the airline during the flight.

At block 610, the decision module 118 may instruct the purchase path module 508 to offer a method of purchasing additional services to the traveler, such as by conducting a purchase transaction on the wireless communication device 106, or the client device 134. In some embodiments, the traveler indicates a desire to purchase a travel data pass, and the purchase path module 508 sends a message to the wireless communication device 106 acknowledging the desire to purchase a travel data pass and the traveler confirms this desire on the wireless communication device 106. The purchase of the travel data pass may be billed to a credit or debit card, may be added to a future bill for carrier services, or may be purchased through some other method.

At block 612, which is optional, the wireless communication device 106 may be configured for the upcoming travel. For example, the wireless communication device 106 may be configured to: connect to a visited network 108, enable VoIP communication, or connect to an in-flight Wi-Fi network. The configuration of the wireless communication device 106 may be performed by the traveler, who may be assisted by prompts from the carrier, or may be performed automatically, such as by the carrier servers 110 sending instructions to the wireless communication device 106 in order to configure the wireless communication device 106 with the desired services for travel.

Through the systems and methods described herein, the wireless communication device is improved by allowing it to be configured for uninterrupted voice and/or data access while traveling. This is accomplished by determining the identity of a traveler along with a travel itinerary by incorporating a carrier component, such as a widget, into the website of a travel partner. The subscribed services of the traveler are analyzed to determine whether the traveler will have voice and/or data access while traveling to the destination. The traveler may be offered additional services to ensure uninterrupted service while traveling and the wireless communication device may be automatically configured to ensure uninterrupted service. The configuration may be triggered by travel dates, GPS location data of the wireless communication device, or some other trigger.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for providing service to a wireless communication device while traveling, the method comprising:

receiving travel itinerary information for a user associated with the wireless communication device, the travel itinerary information including a travel destination location and a date of travel;

retrieving account information associated with the user, the account information including wireless communication services for which the user has subscribed;

determining that the wireless communication device is unauthorized to use, during travel to the travel destination or at the travel destination, one or more partner wireless communication services provided by a partner wireless communication network that includes at least one of the wireless communication services;

transmitting configuration data to the wireless communication device that provides information associated with accessing at least one of the one or more partner wireless communication services; and causing the wireless communication device to be configured to use the at least one of the one or more partner wireless communication services provided by the partner wireless communication network.

2. The method of claim 1, wherein the wireless communication services comprise cellular network services.

3. The method of claim 1, wherein the partner wireless communication network is a cellular network operating at the travel destination location.

4. The method of claim 1, wherein the partner wireless communication services comprise Wi-Fi network services.

5. The method of claim 1, wherein retrieving the account information associated with the user comprises receiving, from a widget embedded in the website of a travel partner configured to collect and send the travel itinerary information, the travel itinerary information at a server associated with the wireless communication services.

6. The method of claim 1, further comprising sending a communication to the wireless communication device with an offer to purchase the partner wireless communication services prior to the date of travel.

7. The method of claim 1, further comprising detecting the location of the wireless communication device and the configuring the wireless communication device for connection to the partner wireless communication network is performed at least in part in response to the detecting the location of the wireless communication device.

8. A non-transitory computer-readable medium having executable instructions stored thereon that, when executed by a computing device, cause a radio access provider to perform operations comprising:

receiving travel itinerary information for a user associated with a wireless communication device, the travel itinerary information including a travel destination location and a date of travel;

retrieving account information associated with the user, the account information including wireless communication services for which the user has subscribed;

determining that the wireless communication device is unauthorized to use, during travel to the travel destination or at the travel destination, one or more partner wireless communication services provided by a partner wireless communication network that includes at least one of the wireless communication services;

transmitting configuration data to the wireless communication device that provides information associated with accessing at least one of the one or more partner wireless communication services; and configuring the wireless communication device to use the at least one of the one or more partner wireless communication services provided by the partner wireless communication network, the partner wireless communication network providing partner wireless communication services during travel.

9. The non-transitory computer-readable medium of claim 8, wherein the wireless communication services comprise cellular network services.

10. The non-transitory computer-readable medium of claim 8, wherein the partner wireless communication network is a cellular network operating at the travel destination location.

11. The non-transitory computer-readable medium of claim 8, wherein the partner wireless communication services comprise Wi-Fi network services.

12. The non-transitory computer-readable medium of claim 8, wherein retrieving the account information associated with the user comprises receiving, from a widget embedded in the website of a travel partner configured to collect and send the travel itinerary information, the travel itinerary information at a server associated with the wireless communication services.

13. The non-transitory computer-readable medium of claim 8, wherein the operations further comprise sending a communication to the wireless communication device with an offer to purchase the partner wireless communication services prior to the date of travel.

14. The non-transitory computer-readable medium of claim 8, wherein the operations further comprise detecting the location of the wireless communication device and the configuring the wireless communication device for connection to the partner wireless communication network is performed at least in part in response to the detecting the location of the wireless communication device.

15. A method for a radio access provider to allow its customers to maintain voice and/or data coverage while traveling, the method comprising:
  receiving, travel itinerary information for a user associated with a wireless communication device, the travel itinerary information including a travel destination;
  determining that the wireless communication device is unauthorized to use, during travel to the travel destination or at the travel destination, one or more partner wireless communication services provided by a partner network;
  causing configuration data to be provided to the wireless communication device that provides information associated with accessing at least one of the one or more partner wireless communication services; and
  configuring the wireless communication device to use the at least one of the one or more partner wireless communication services provided by the partner network at the travel destination.

16. The method as recited in claim 15, wherein receiving the travel itinerary information for the user associated with the wireless communication device, comprises receiving the travel itinerary information from a widget located at a travel reservation website.

17. The method as recited in claim 15, further comprising:
  retrieving account information associated with the user, the account information including wireless communication services for which the user has subscribed.

18. The method as recited in claim 15, further comprising sending a communication to the wireless communication device with an offer to purchase partner wireless communication services prior to a date of travel.

19. The method as recited in claim 15, further comprising receiving location information from the wireless communication device and configuring the wireless communication device to access a partner network is based at least in part on the location information.

20. The method as recited in claim 15, further comprising sending a notification to a user associated with the wireless communication device offering services that will permit the wireless communication device to access the partner network at the travel destination.

* * * * *